Aug. 18, 1942.   J. RAZEK   2,293,403
SYSTEM FOR INDICATING RATIOS
Filed Oct. 8, 1941   4 Sheets-Sheet 4
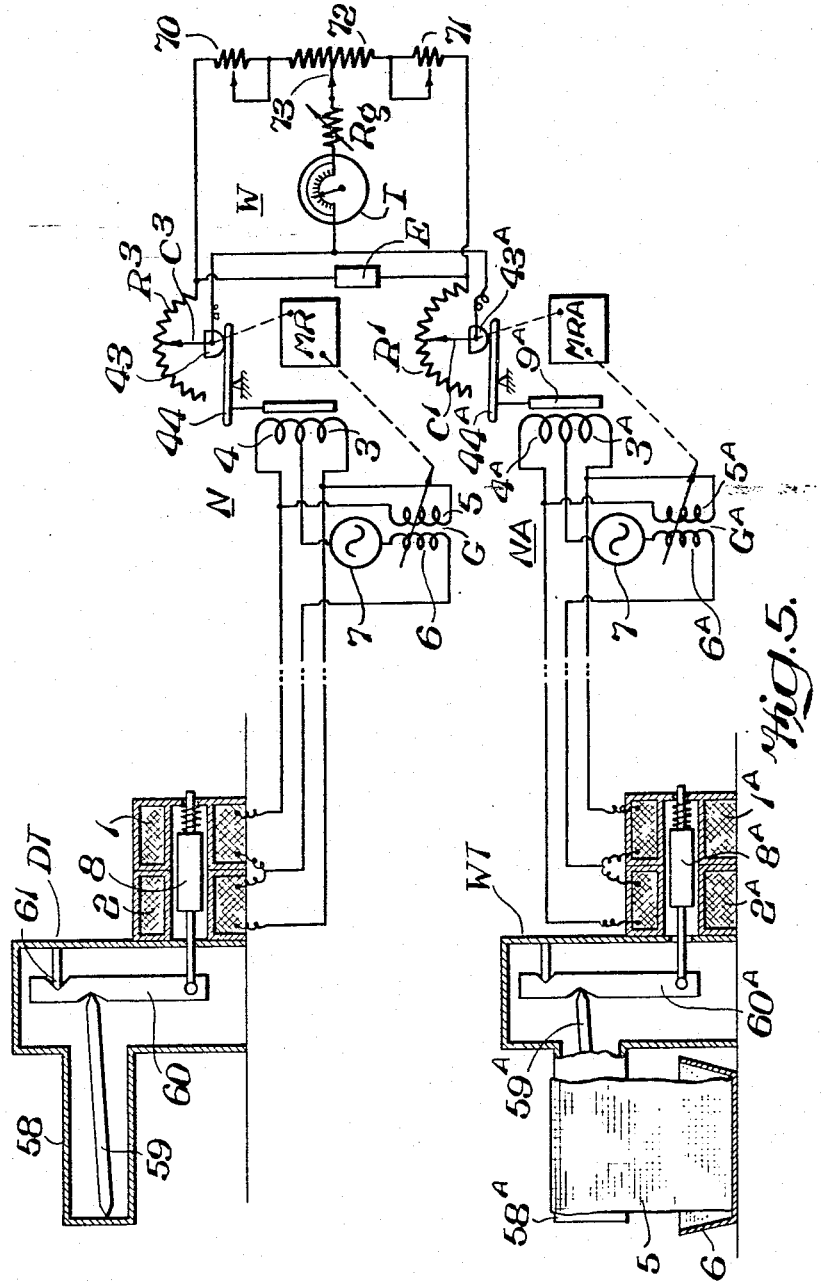
INVENTOR.
JOSEPH RAZEK
BY
ATTORNEY.

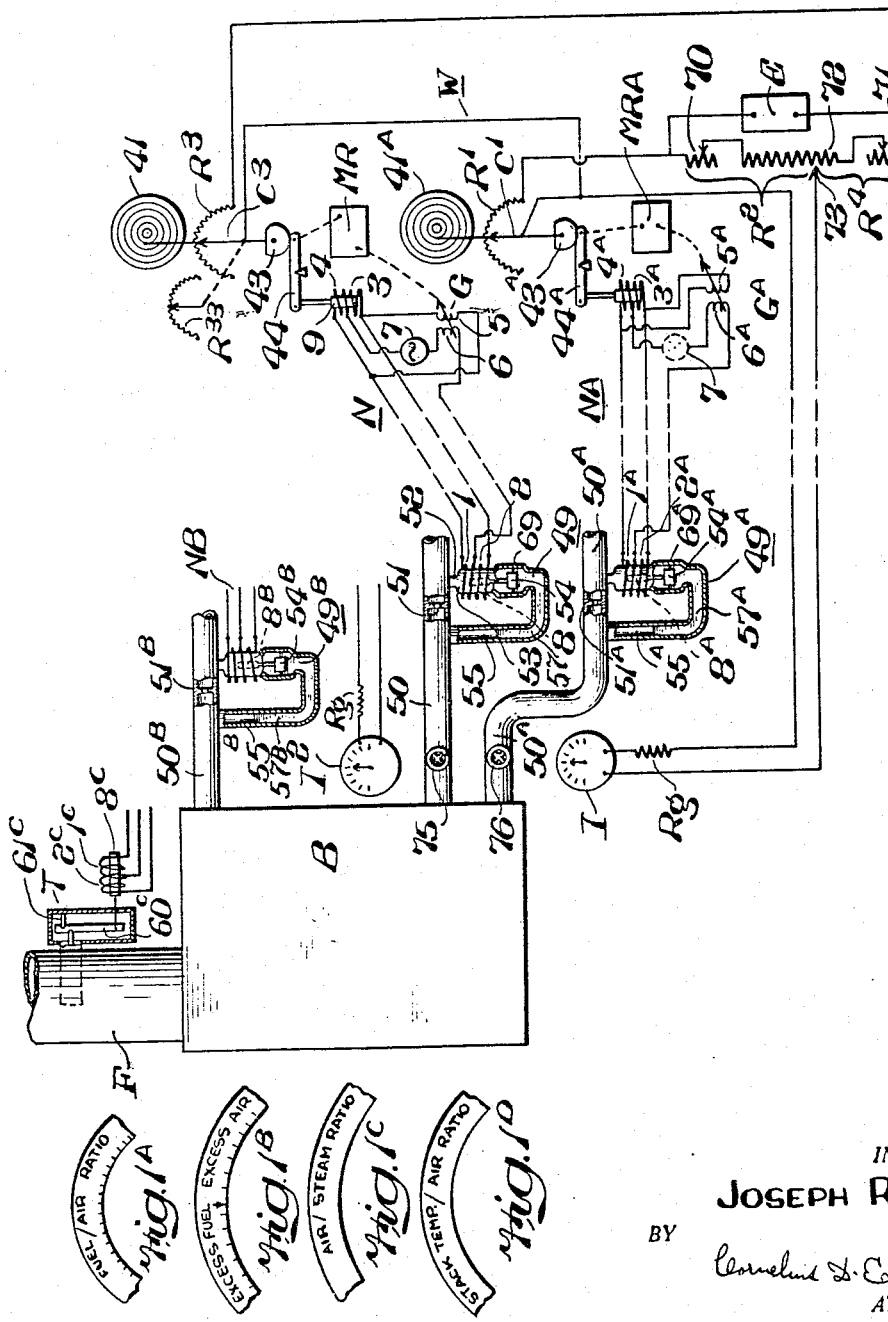

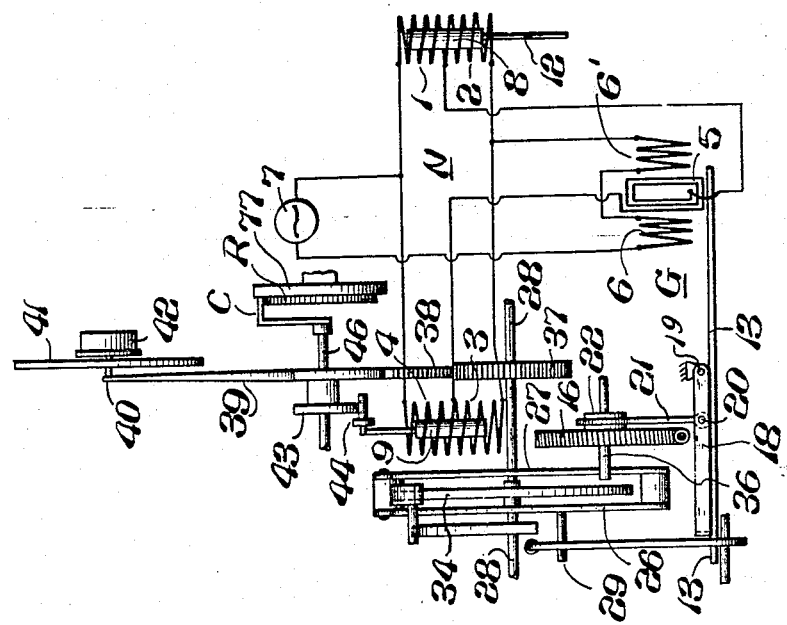
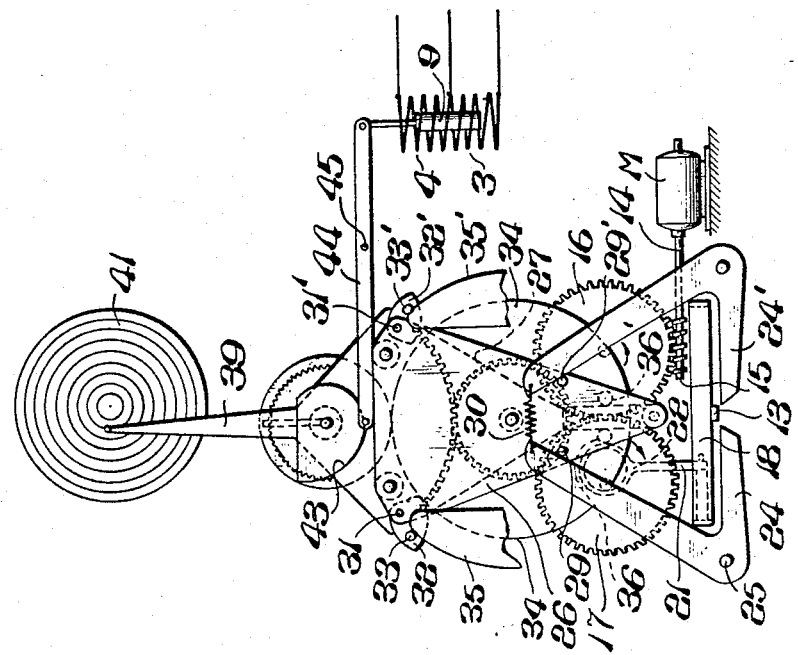

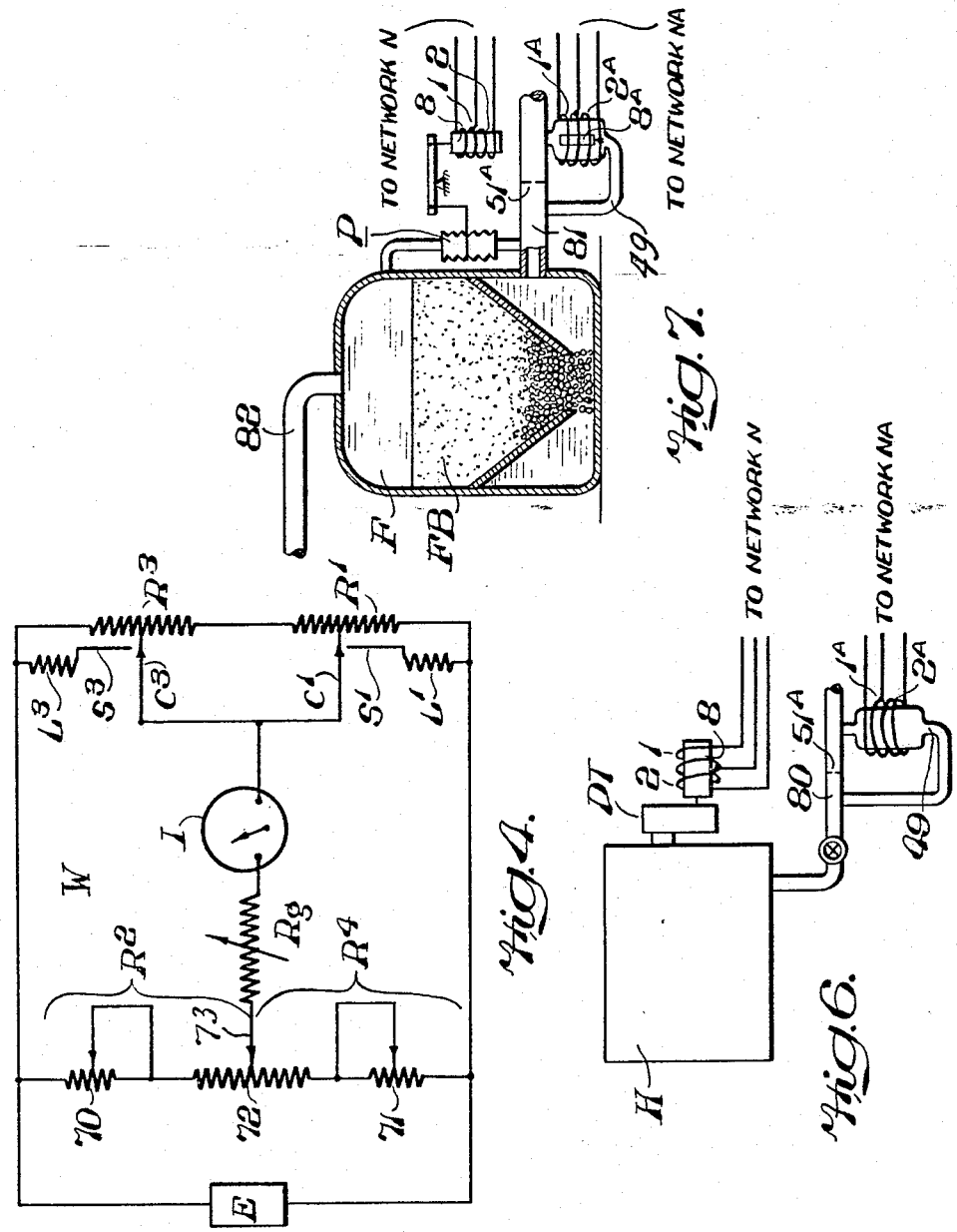

Patented Aug. 18, 1942

2,293,403

UNITED STATES PATENT OFFICE 2,293,403

SYSTEM FOR INDICATING RATIOS

Joseph Razek, Llanerch, Pa., assignor to Cochrane Corporation, Philadelphia, Pa., a corporation of Pennsylvania Application October 8, 1941, Serial No. 414,166

10 Claims. (Cl. 177—351)

My invention relates to systems for indicating the relation of the magnitude of a condition, such as rate of flow, pressure, temperature, or the like, to the co-existent magnitude of another, similar or dissimilar, condition.

In accordance with my invention, the changes in magnitude of the conditions are utilized, preferably through self-balancing electro-mechanical systems, to vary impedances of an electrical network for impression upon a galvanometer, or equivalent deflection instrument, of a difference of potential of magnitude varying as a function of the relation to each other of the concurrent magnitudes of said conditions.

More particularly, the aforesaid electrical network is an unbalanced Wheatstone bridge, the galvanometer arm of which is of impedance large compared to the impedances of the other arms of the bridge to procure accuracy of the galvanometer readings in terms of ratios of the magnitudes of said conditions.

My invention further resides in the features of construction, combination and arrangement hereinafter described and claimed.

For an understanding of my invention, reference is made to the accompanying drawings, in which:

Fig. 1 diagrammatically illustrates a system for indicating or recording ratios of variables including the ratio of rates of flow of fluids.

Figs. 1A, 1B, 1C and 1D are scales for indicating devices shown in Fig. 1.

Fig. 2 is a front elevational view of significant elements of a mechanical relay schematically shown in Fig. 1.

Fig. 3 is a side elevational view of parts of the mechanism illustrated in Fig. 2 and diagrammatically shows circuit elements associated therewith.

Fig. 4 illustrates a modification of network W of Fig. 1.

Figs. 5, 6, and 7 schematically illustrate arrangements for determining the relations to each other of various variables.

Referring to Fig. 1, as exemplary of a system for whose proper or efficient operation the rates of flow of two fluids should be maintained at proper ratio, the pipes 50 and 50A supply air and fuel respectively to the combustion chamber of steam generator B.

The manometer 49 for positioning the armature 8 relative to coils 1 and 2 in accordance with the rate of flow of air through pipe 50 comprises a pressure-tight tube 53 of non-magnetizable material disposed within coils 1 and 2 and enclosing the magnetizable plunger or armature 8. Tube 53 is connected to pipe 50 on one side of orifice 51, or equivalent restriction, providing a pressure differential varying as a function of the rate of flow through pipe 50; to the other side of orifice 51 is connected a second tube 55 in which is disposed float 54 which carries plunger 8. The manometer fluid 57, mercury, or other liquid, causes the vertical position of float 54 and therefore of plunger 8 to vary in accordance with the difference in pressure across orifice 51.

The coils 1 and 2, whose inductances are differentially varied by rise or fall of plunger 8, are comprised in a normally balanced network N including the coils 3 and 4 whose inductances may be differentially varied by change in position of armature or plunger 9.

Upon change in position of plunger 8, the network N is temporarily unbalanced in sense dependent upon whether the air flow has increased or decreased from its prior magnitude and to extent dependent upon the magnitude of the change of rate of flow; the galvanometer G responds to the unbalance of network N and through mechanical relay mechanism MR effects adjustment of plunger 9 with respect to coils 3 and 4 in sense and to extent restoring balance of network N for the new rate of flow.

Concurrently with the rebalancing adjustment of core 9, there is effected adjustment of impedance R3, specifically a resistance, to a position corresponding with the position of plunger 8, and therefore with the rate of flow, of air in the particular system being described, through pipe 50.

By a generally similar metering arrangement including manometer 49A, normally balanced network NA, galvanometer GA, and mechanical relay MRA, the impedance R1 is varied so that its magnitude at all times corresponds with the rate of flow, of fuel gas or liquid in the particular system of Fig. 1, through pipe 50A.

It is essential the variable resistance R1 and R3 each should be so mounted in its respective metering device that the zero of each resistance corresponds with the zero of the associated metering device. In the extreme case, when both metering devices are at zero, both resistances R1 and R3 are of zero magnitude, and so effectively short-circuit the source E. To avoid this, the contacts C1 and C3 may be lifted, as by structures S1, S3, from their associated resistors R1, R3 when their positions correspond with less, for example, than 10% or 15% of full range of the respective primary measuring devices. This simple remedy however may produce false readings; for example, with both contacts C1 and C3 lifted off, the indicator I would be in the null position which, in normal operation, would, in accordance with a preferred method, indicate there existed the desired ratio of the two variables under measurement.

To avoid aforesaid short-circuiting of the supply without possibility of false indication by meter I, the contacts C1 and C3 may be lifted off as above stated without however interrupting the circuit of meter I; as shown in Fig. 4, as contact C3 approaches the "zero" end of resistance R3 it is lifted therefrom by a contact segment S3 with which it remains in electrical engagement for all positions of contact C3, within for example, 0% to 15% of resistance R3. Segment S3 is connected to either terminal of rheostat R3 through a resistance L3 of suitable magnitude, for example 3000 ohms, so to provide a substitute connection of high fixed resistance between source E and meter I when contact C3 interrupts the circuit from source E to meter I through a small percentage of resistor R3.

Similarly, as contact C1 approaches the "zero" end of resistance R1 it is lifted therefrom by contact strip S1 of length corresponding for example to 0% to 15% of the range of adjustment of rheostat R1. Segment S1 is connected to either terminal of rheostat R1 by resistance L1 of suitable magnitude, for example 1500 ohms, substantially different from L3 so that when the contacts C1, C3 are at the low ends of their respective ranges of adjustment, the indicating pointer of meter I is beyond the calibrated meter scale and preferably concealed by a shield or coacting with a suitable legend or symbol indicative of the abnormal condition.

The network W, Figs. 1 and 4, comprising impedances R1, R3, is an unbalanced Wheatstone bridge two of whose adjacent arms or branches respectively include aforesaid impedances R1 and R3 and another two of whose adjacent arms comprise impedances R2 and R4. One diagonal arm of the bridge includes a suitable source of current E, for example a battery of capacity ample to ensure constancy of the voltage impressed by it upon the network W despite variation of the current demand upon the battery by network W; alternatively source E may comprise a voltage-regulating device and a source of current itself having an output voltage which does not remain constant. The other diagonal arm of the bridge W includes the galvanometer I, or equivalent deflection instrument; whether meter I is an alternating-current or a direct current instrument depends upon whether E is a source of direct or alternating current; for simplicity, it is here assumed I is a direct current instrument and E is a direct-current source. If alternating current is used, all resistances of network W should have inappreciable reactance; in the particular arrangement shown, the networks N and NA are supplied with alternating current from any suitable source 7, such as a 60 cycle power line, usually through step-down transformers, not shown.

The unbalance current of the bridge W which traverses the galvanometer I is of magnitude ascertainable from the formula
(1)
$$ig\left[Rg(R2+R4)\left(1+\frac{R3}{R1}\right)+R2.R4\left(1+\frac{R3}{R1}\right)+R3(R2+R4)\right]=E\left[R2.\frac{R3}{R1}-R4\right]$$

Wherein:

$ig$ = unbalance or galvanometer current
$Rg$ = galvanometer resistance

Assuming impedances R2 and R4 have been set, as hereinafter explained, to predetermined values and the impedances R3 and R1 are varied, it is evident from inspection of the Formula 1 that, except for the term $R3(R2+R4)$ the galvanometer current is a function of the ratio R3/R1 and constant terms. That the deflection of galvanometer I may accurately correspond with the ratio to one another of the rates of flow of fuel and primary air to the steam generator B, the effect of the term $R3(R2+R4)$ may be reduced to extent necessary to procure the desired accuracy by making the maximum magnitude of R3 small as compared with the other impedances of the network W, and particularly as compared with $Rg$, the total resistance included in or constituting the galvanometer arm of the bridge. Otherwise stated, the maximum current traversing the galvanometer for all possible settings of R1 and R3 should be very small compared with the current traversing the resistances R1, R2, R3 and R4 and to that end, consistent with other considerations such as sensitivity and damping, the resistance $Rg$ should be large and may to substantial extent comprise resistance external to the galvanometer winding.

By way of example, the indicating instrument I may be a milliammeter requiring two milliamperes for full-scale deflection and having low internal or winding resistance—for example 30 ohms; the external series resistance ($Rg$) may be approximately 2000 ohms; rheostats R1 and R3—400 ohms each; rheostats 70, 71 and voltage-divider 72 which comprise arms R2, R4 of the network W may be respectively 450, 450 and 100 ohms; E is 20 volts. With these values, the maximum possible error due to the term $R3(R2+R4)$ is of the order of about 7%. This error, however, rapidly diminishes with decrease from maximum of the magnitude of resistance R3.

Moreover, in commercial application of my system the maximum error is actually much less than above indicated because in operation the incident range of variation of the ratio to each other of the magnitudes of resistances R3 and R1 is generally limited; for example, within the usual operating range, the ratio R3/R1 at one operating point does not differ from the ratio R3/R1 at any other usual operating point by a factor of more than about 2; specifically, a commercial or operating range may include R3/R1 ratios of 7/10 and 15/10. Within such limited range, the error due to aforesaid term $R3(R2+R4)$ may be further minimized by calibrating the indicator I for a suitable mean or intermediate magnitude of R3.

Furthermore, aforesaid error becomes less and less as the galvanometer current ($ig$) decreases; consequently, the resistors R2 and R4 may be so set or selected that network W is balanced (zero galvanometer current) when the settings of variable resistors R1, R3 correspond, in the steam-generator installation of Fig. 1 for example, with the optimum rates of supply of air and fuel at normal or usual load. The indicator I may be of such type that for zero current therethrough its pointer will be at mid-scale or any other convenient or suitable reference point of the scale.

The scale of the instrument I may be calibrated as in Fig. 1A to read directly in terms of the ratio of fuel to air in which case the attendant of the boiler changes the settings of one or both of the valves 75, 76 to maintain the deflecting element of meter I at the scale setting corresponding with that ratio which he has been advised, or that he knows, affords maximum fuel efficiency or desired operating condition.

Alternatively, the meter I may have its mechanical zero at midscale, Fig. 1B, and the network W may be so adjusted, as by rheostats 70, 71 or contact 73 of the voltage-divider 72, that it is balanced, null current through the galvanometer, for magnitudes of R3 and R1 affording the desired fuel-air ratio; in such case, deflection of the meter pointer, or equivalent, in one direction from its central or null position indicates to the attendant there is excess of air or insufficiency of fuel whereas deflection of the pointer in opposite direction from its neutral indicates insufficiency of air or excess of fuel. From the extent of deflection of the pointer from its neutral, the attendant can judge to what extent the setting of valve 75 or 76, or both, should be changed.

Each of resistances 70 and 71 may be of the so-called fixed adjustable type having a contacting band or ring adjustable along a coil of resistance wire wound on a suitable form; because these resistors are of relatively high magnitude of resistance they cannot readily be precisely adjusted to determine the balance or null point of the network W. Rheostat 72 is of lower magnitude of resistance, so permitting the balance point easily to be precisely set by adjustment of contact 73 operable by a knob or other convenient means.

The variability of resistances 70, 71 and 72 permits the optimum ratio of the rates of supply of fuel and air to be selected in compensation for such variables as different amounts of moisture in the primary air, and variation in the B. t. u.'s per unit volume of fuel. Accordingly, the resistances 70, 71 and 72, which may be disposed remote from boiler B, indicator I, and valves 75, 76 as in the office of the plant engineer or supervisor, are reset from time to time in accord with analyses of the air and fuel without need for instruction of the boiler attendant that a different fuel-air ratio, as observed by him from meter I, is to be maintained.

The rates of flow of air and fuel may be recorded upon the charts 41, 41A suitably driven by a constant speed motive device, and having marking elements 39, 39A adjustable concurrently with resistances R3, R1 respectively. The recorders may be located near or remote from one another as convenience or necessity may require; for example, they may be disposed at the supervisor's office or station.

For indication of the ratio of the rates of flow of steam and primary air, there may be provided an indicating instrument I2 included in an unbalanced bridge similar to network W and including impedance R33, adjusted concurrently with rebalancing of network N to a position corresponding with the rate of flow of primary air, and an impedance, not shown, corresponding with impedance R1 adjusted concurrently with the rebalancing of network NB to a position corresponding with the rate of flow of steam through pipe 50B.

Inasmuch as the construction and operation of the arrangement for indicating the steam/air ratio may be substantially identical with the previously herein described arrangement for indicating the fuel/air ratio, further description is unnecessary.

Upon substitution for any one or more of the manometers, 49, 49A of an element suited for response to changes in magnitude of pressure, temperature or other condition, the meter I indicates the relation or ratio of the concurrent magnitudes of the two conditions selected respectively to affect the networks N, NA which are preferably of the type described and claimed in U. S. Letters Patent 2,081,364.

When, for example, it is desired the meter I shall indicate the relations or ratios to each other of the concurrent magnitudes of two temperatures, such as wet and dry bulb temperatures for measuring or indicating humidity, the manometer 49 for adjusting impedances 1, 2 of network N may be replaced by a dry bulb temperature responsive device DT, Fig. 5, such as shown in Fig. 4 of U. S. Letters Patent 2,010,554, and manometer 49A may be replaced a similar device WT provided with a wick 5 and reservoir 6, or equivalent arrangement, for response to wet bulb temperature.

More particularly, the primary responsive device DT comprises a tube 58 of iron, or equivalent, enclosing a rod or strip 59 of nickel steel, or equivalent material, having a temperature coefficient of expansion suitably different from that of tube 58. The rod 59 at one end abuts tube 58 and at its other end forms a knife-edge bearing against lever 60 which is supported by second knife-edge 61 and connected to the movable core 8 of impedance device 1, 2 of network N, so to effect adjustment of impedance R3 of network W in response to changes of dry bulb temperature.

In like manner, the common core 8A of impedances 1A, 2A of network NA is positioned by lever 60A in direct response to changes in wet bulb temperature to effect adjustment of impedance R1 of network W.

Consequently, in the system of Fig. 5, the current traversing meter I of the network W is at all times substantially proportional to the ratio of wet and dry bulb temperatures; meter I may therefore be directly calibrated in percent relative humidity.

It is not feasible for measurement of relative humidity to replace the mechanically adjustable resistances R1, R3 of Fig. 5 by resistances whose variations in effective magnitude depend upon the temperature coefficient of resistance of the resistance material because the law of variation of such resistances with temperature is not such that their resistance is zero for zero (absolute) magnitude of temperature. As hereinbefore stated, each of applicant's resistances R1 and R3 is so set that its zero corresponds with the zero of the associated metering device; under such circumstances the unbalance current traversing meter I is substantially proportional to the ratio of the instantaneous magnitudes of the temperatures or of the various other conditions to which the primary metering devices are responsive.

For measurement of the ratio of any other two temperatures, an arrangement similar to Fig. 5 with omission of the wick 5 and reservoir 6 may be used.

If in the system of Fig. 1 it is desired to indicate or record by meter I the relation of the temperatures, for example of stack gases, to the different magnitudes of some other condition of operation, such as the rate of flow of combustion air, there may, in Fig. 1, be substituted for manometer 49 and its impedance device 1, 2 the temperature-responsive device T and its impedance device 1C, 2C so to effect by relay device MR of network N adjustment of impedance R3 of network W in accordance with flue gas temperature. Impedance R1 of the network W is varied, as previously herein described, to magnitudes corresponding respectively with different rates of flow of combustion air as measured by manometer 49.

To convert the system of Fig. 5 for measurement of the ratio of the rate of flow to a tank H, as of hot make-up water, for boiler feed, or any other purpose, Fig. 6, to the temperature of water in the tank, the temperature responsive device WT of Fig. 5 is replaced by a suitable device, such as manometer 49, Fig. 6, responsive to rate of flow of make-up water in pipe 80, and the temperature responsive device DT is placed in suitable heat-transfer relation to the water in tank H.

In this modification, Fig. 6, the resistance R3 of Fig. 5 is adjusted in correspondence with the tank temperature by the relay device MR under control of network N which is unbalanced by variation of impedances 1, 2 when their common core 8 is moved by the device DT, and rebalanced by variation of impedances 3, 4 when their core 9 is moved to suitable extent and direction by relay MR. Similarly, resistance R1 is adjusted in correspondence with the rate of flow of make-up water by the relay device MRA under control of network NA including impedances 1A, 2A adjustable by movable element 8A of the manometer 49.

For conversion of the system of Fig. 5 to one in which meter I indicates or records the relation between the drop of pressure across the bed FB, Fig. 7, for filtering, softening or otherwise treating a liquid, as water, to the rate of flow of liquid to or from the bed, one of the temperature-responsive devices, for example DT of Fig. 5 is replaced in Fig. 7 by a suitable pressure-responsive device P and the other temperature-responsive device WT of Fig. 5 is replaced by a suitable flow-responsive device for example manometer 49, Fig. 7.

Pressure-responsive device P may, as shown, comprise a pair of opposed Sylphons or bellows having their remote ends connected to the filter tank F on opposite sides of or "across" the bed FB of suitable filtering material and there are provided suitable mechanical connections from the adjacent ends of the bellows to the movable core 8 of the inductances 1, 2 of network N.

The manometer 49, for varying the relative magnitudes of impedances 1A and 2A by adjustment of core 8A is connected across a restriction or orifice plate 51A in either the filter outlet pipe 81 or the inlet pipe 82, depending upon the ratio to be measured.

In general, by proper selection of primary response devices the impedances R1, R3 of network W are automatically adjusted to procure indication by meter I of the relation or ratio to each other of the concurrent magnitudes of any other two variable conditions; in relatively rare cases, networks N, NA and relays MR, MRA or their equivalents may be dispensed with, and the primary devices directly coupled to the adjustable members of the impedances R1, R3, for example, in Fig. 5, the plungers 8, 8A might be omitted and their actuating arms 60, 60A mechanically coupled to the adjustable contact members of rheostats R1, R3; but in most installations, such direct mechanical connection of the primary response devices would result in false and misleading readings of meter I because of insensitivity of the loaded response devices.

The mechanical relay mechanism for effecting rebalance of each of the networks N, NA and NB is preferably of the type shown in Figs. 2 and 3 and is substantially identical with the mechanism disclosed in aforesaid Letters Patent 2,010,554.

Assuming core 8 has been displaced to unbalance the network N, Fig. 3, is such sense that the galvanometer pointer 13 deflects to the left from its null position, Fig. 2, the mechanical relay mechanism moves core 9 to rebalance network N and adjusts resistance R (exemplary of any of resistances R1, R3, R33, etc.) of network W in the following manner.

A U-shaped depressor bar 18, pivoted on each side at 19, is alternately raised and depressed, at frequent intervals, say twenty or thirty times per minute, by eccentric 22 connected to bar 18 by link 21 and pivot pin 20. The eccentric is rotatable with gear 17 driven from motor M, or other suitable constant speed device, through shaft 14, worm 15 and gear 16.

In the position shown in Fig. 2, bar 18 is at that portion of its oscillation which permits the galvanometer freely to swing to the right or left of its null position in accordance with unbalance, if any exists, of network N. Under the conditions assumed for purpose of explanation, the pointer has deflected to the left between the lower surface of bar 18 and the upper surface of the left-hand bell crank lever 24. Immediately thereafter, the bar 18 is depressed and pointer 13 is clamped between the bar and lever 24 so that crank lever 24 is rotated clockwise about its pivot 25 until bar 18 reaches the bottom of its stroke. This movement of crank lever 24 is transmitted to the yoke assembly comprising plates 26 and 27 by pin 29 which extends from plate 26 into the path of lever 24. For small deflections of pointer 13 to the left of null position, it engages lever 24 at a point far from pivot 25 and consequently plates 26, 27 are moved counter-clockwise about shaft 28 through a small angle whereas for larger deflections of pointer 13 to the left the lever 24 is engaged nearer its pivotal point and moves plates 26, 27 through a correspondingly larger angle.

A second bell crank lever 24' is adapted to be actuated in counter-clockwise direction when pointer 13 deflects to the right of null position to rock the yoke assembly 26, 27 in clockwise direction about shaft 28. A tension spring 30 maintains engagement of levers 24, 24' with pins 29 and 29' respectively.

The yoke assembly carries the reversely acting pawls 32 and 32' eccentrically mounted upon pivots 31 and 31' for engagement with clutch disc 34 under circumstances hereinafter described. Pins 33 and 33' extending from pawls 32 and 32' respectively cooperate with cams 35 and 35' respectively to prevent rotation of disc 34 in undesired direction. The edges of the cams 35, 35' (only incompletely shown) are arcs having their centers coincident with the axis of rotation 28 of the yoke assembly. Under the conditions above assumed, the yoke assembly is moved in counter-clockwise direction from the position shown in Fig. 2 and consequently during that setting movement, pawl 32 is held by cam 35 out of engagement with disc 34 whereas pawl 32' is in engagement with the disc but does not however, because of its eccentric mounting, effect rotation of disc 34.

As the depressor bar 18 is lifted, the yoke assembly is returned to its neutral or mid-position, Fig. 2, by engagement of pin 36' extending from gear 16 with back-plate 27 of the assembly. During this return movement of the yoke, pawl 32' because of its eccentric mounting pivots into wedging engagement with clutch disc 34 and so rotates it in clockwise direction through an angle corresponding with the galvanometer deflection.

The rotation of disc 34 is transmitted through gear 37 and sector 38 to shaft 46 which carries the movable element, for example contact C, of the variable resistance R mounted upon supporting member 17. Upon shaft 46 is also mounted cam member 43 which through lever 44, pivoted at 45, effects movement of core 9 with respect to coils 3 and 4 by the resulting differential variation of the inductances of the coils rebalances the network N. The relative positions of the contact C and slidewire R is therefore varied in accordance with the changes in magnitude of the condition to which plunger 8 is responsive and the effective magnitude of resistance R for different settings of shaft 46 corresponds with the concurrently existing magnitude of the condition.

The cam surface 43 is so shaped or slidewire R is so constructed that equal increments of adjustment of plunger 8 effect equal increments of change of resistance R.

When it desired to record the changes in magnitude of one or both of the conditions the ratio of whose concurrent magnitudes is indicated by meter I or I2, there may be attached to the shaft 46 of the corresponding mechanical relay or relays an arm 39 carrying a marker or stylus 40 for suitably tracing a record upon a chart 41 rotated by clockwork mechanism 42 or equivalent.

If it is desired to record the ratio of the concurrent magnitudes of the conditions, meter I may be replaced by or comprise any suitable recorder of the deflection type; for example, it may be of known type, such as the General Electric recording milliammeter or a Thwing-Albert recording millivoltmeter, in which the deflecting element of the meter serves as a stylus intermittently pressed against a recorder chart or strip moved at constant speed with respect to the path of the stylus.

What I claim is:

1. A system for indicating the relation of the magnitude of one condition to the magnitude of another condition comprising an unbalanced Wheatstone bridge, variable impedances in different arms of said bridge respectively of magnitude corresponding with the magnitudes of said conditions, and an indicating instrument in another arm of the bridge traversed by the unbalance current of the bridge, said last named arm including impedance of magnitude ensuring said unbalance current is of magnitude small compared to the currents traversing said arms and so provide that throughout the ranges of adjustment of the magnitudes of said impedances the relation of said current to the ratio of the magnitudes of said impedances is substantially linear.

2. A system for indicating the relation of the magnitude of one condition to the magnitude of another condition comprising a normally balanced electrical network unbalanced upon change in magnitude of one of said conditions, means for rebalancing said network at each existing magnitude of said one condition and for varying the magnitude of an impedance, a second normally balanced electrical network unbalanced upon change in magnitude of another of said conditions, means for rebalancing said second network at each existing magnitude of said other condition and for varying the magnitude of an impedance, and an unbalanced third network including said variable impedances, and an instrument traversed by the unbalance current of the third network for indicating the relation to each other of the magnitudes of said conditions.

3. A system for indicating the relation of the magnitude of one condition to the magnitude of another condition comprising a normally balanced electrical network unbalanced upon change in magnitude of one of said conditions, means for rebalancing said network at each existing magnitude of said one condition and for varying the magnitude of an impedance, a second normally balanced electrical network unbalanced upon change in magnitude of another of said conditions, means for rebalancing said second network at each existing magnitude of said other condition and for varying the magnitude of an impedance, a third network including said variable impedances and a branch traversed by current of magnitude varying as a function of the ratio of said impedances, and an instrument traversed by said current having a movable member indicating the relation to each other of the magnitudes of said conditions.

4. An arrangement comprising a normally balanced system, means deflecting in response to unbalance of said system, means responsive to change in magnitude of a condition for unbalancing said system, means controlled by said deflecting means for rebalancing said system at each magnitude of said condition and for adjusting an impedance, a second normally balanced system, means deflecting in response to unbalance of said second system, means responsive to change in magnitude of a second condition for unbalancing said second system, means controlled by said second-named deflecting means for rebalancing said second system and for adjusting a second impedance, an electrical network including said variable impedances for producing a difference of potential of magnitude varying as a function of the ratio of said impedances, and an instrument upon which said difference of potential is impressed to produce a deflection continuously indicative of the relation to each other of concurrently existing magnitudes of said conditions.

5. A system for indicating the relation of the magnitude of one condition to the magnitude of another condition comprising adjustable impedances having respectively adjustable elements whose zero positions correspond respectively with zero magnitudes of said conditions, means for adjusting said elements to positions corresponding respectively with the magnitudes of said conditions, a bridge network including said impedances in different arms thereof, a source of current for said network, an indicating instrument responsive to unbalance of said bridge, and means for protecting said current source comprising means for interrupting the circuit to at least one of said variable impedances as its aforesaid adjustable element approaches its aforesaid zero position.

6. A system for indicating the relation of the magnitude for one condition to the magnitude of another condition comprising adjustable impedances having respectively adjustable elements whose zero positions correspond respectively with zero magnitudes of said conditions, means for adjusting said elements to positions corresponding respectively with the magnitudes of said conditions, a bridge network including said impedances in different arms thereof, a source of current for said network, an indicating instrument responsive to unbalance of said bridge, and means for protecting said current source comprising means for interrupting the circuit to said variable impedances as their adjustable elements approach their aforesaid zero positions.

7. A system for indicating the relation of the magnitude of one condition to the magnitude of another condition comprising adjustable impedances having respectively adjustable elements whose zero positions correspond respectively with zero magnitudes of said conditions, means for adjusting said elements to positions corresponding respectively with the magnitudes of said conditions, a bridge network including said impedances in different arms thereof, a source of current for said network, an indicating instrument responsive to unbalance of said bridge, and means for protecting said current source comprising means for excluding said variable impedances from the circuit of said source as the adjustable elements of said impedances approach their aforesaid zero positions and means for substantially concurrently substituting for said impedances impedance of high finite magnitude in circuit with said source and said indicating means.

8. A system for indicating the relation of the magnitude of one condition to the magnitude of another condition comprising resistances each having a relatively adjustable contact whose zero position corresponds with zero magnitude of one of said conditions, means for adjusting said contacts to positions corresponding respectively with the magnitudes of said conditions, a bridge network including said resistances in different arms thereof, a source of current for said network, an indicating instrument responsive to unbalance of said bridge, and means for protecting said current source comprising means effecting disengagement between at least one of said contacts and its associated resistance as the position of zero resistance is approached.

9. A system for indicating the relation of the magnitude of one condition to the magnitude of another condition comprising resistances each having a relatively adjustable contact whose zero position corresponds with zero magnitude of one of said conditions, means for adjusting said contacts to positions corresponding respectively with the magnitudes of said conditions, a bridge network including said resistances in different arms thereof, a source of current for said network, an indicating instrument responsive to unbalance of said bridge, and means for protecting said current source comprising means effecting disengagement between at least one of said contacts and its associated resistance as the position of zero resistance is approached, and means for substantially concurrently connecting a high resistance in circuit with said contact, said source and said indicating instrument.

10. A system for indicating the relation of the magnitude of one condition to the magnitude of another condition comprising resistances each having a relatively adjustable contact whose zero position corresponds with zero magnitude of one of said conditions, means for adjusting said contacts to positions corresponding respectively with the magnitudes of said conditions, a bridge network including said resistances in different arms thereof, a source of current for said network, an indicating instrument responsive to unbalance of bridge, and means for protecting said current source comprising means effecting disengagement between at least one of said contacts and its associated resistance as the position of zero resistance is approached, and means for substantially concurrently connecting resistance between said contact and the other terminal of said associated resistance.

JOSEPH RAZEK.